United States Patent [19]

Tsuiki

[11] 3,878,380

[45] Apr. 15, 1975

[54] EXPONENT INDICATING SYSTEM

[75] Inventor: Takao Tsuiki, Tokyo, Japan

[73] Assignee: Hitachi, Ltd., Tokyo, Japan

[22] Filed: Oct. 4, 1973

[21] Appl. No.: 403,442

[30] Foreign Application Priority Data

Oct. 4, 1972 Japan ............................... 47-99044

[52] U.S. Cl. ............................. 235/152; 340/324 R

[51] Int. Cl. ................................................ G06f 3/14

[58] Field of Search ........... 235/156, 159, 160, 164, 235/152; 340/172.5, 324 R

[56] References Cited

UNITED STATES PATENTS

| | | | |
|---|---|---|---|
| 3,358,125 | 12/1967 | Rinaldi | 235/160 X |
| 3,380,031 | 4/1968 | Clayton et al. | 340/172.5 |
| 3,492,656 | 1/1970 | Hildebrandt | 340/172.5 |
| 3,691,358 | 9/1972 | Angelor et al. | 235/159 |
| 3,760,171 | 9/1973 | An Wang et al. | 235/156 |

*Primary Examiner*—Malcolm A. Morrison
*Assistant Examiner*—David H. Malzahn
*Attorney, Agent, or Firm*—Craig & Antonelli

[57] ABSTRACT

An exponent indicating system for use in the display of an electronic calculator or the like, which comprises a decimal point register having memory places in excess of the effective indication or calculation places of the display. Using the excessive places, an exponent is indicated so as to show the approximate figures of a number having more places than the effective indication or calculation places.

16 Claims, 5 Drawing Figures

EXPONENT INDICATING SYSTEM

BACKGROUND OF THE INVENTION

1. Field of the Invention

The present invention relates to an indicating system for an electronic calculator, etc., and more particularly to an exponent indicating system therefor.

2. Description of the Prior Art

In the conventional electronic desk calculators, when a calculated result or a set number exceeds the number of effective indication places or the number of effective calculation places, it is indicated as an error or overflow. This is a very undesirable condition.

SUMMARY OF THE INVENTION

The present invention has been made with a view toward improving the situation of the prior art, and has its object in making it possible to indicate the approximate figures of a number whose number of places is larger than the number of effective indication places or effective calculation places.

In accordance with the present invention, there is provided an exponent indicating system which comprises a decimal point register storing the position of the decimal point of a calculated result or a set number, an exponent being indicated in conformity with the contents of the decimal point register when they reach a predetermined value.

Figure 1A:
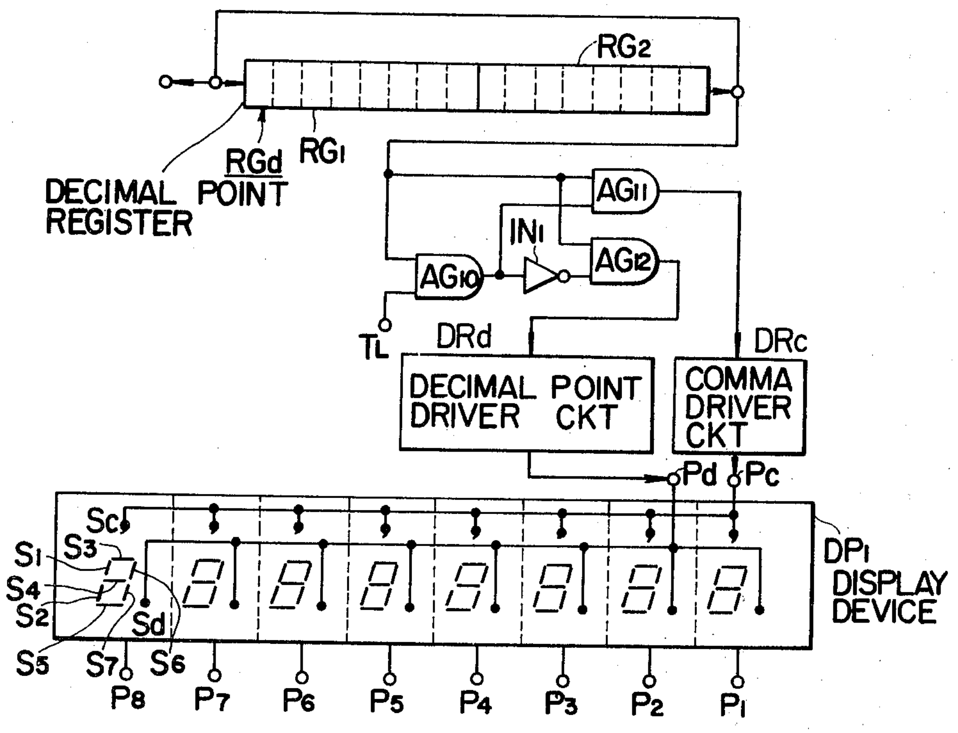
FIG. 1*a* is a schematic block diagram of one embodiment of the present invention.
Figure 1B:
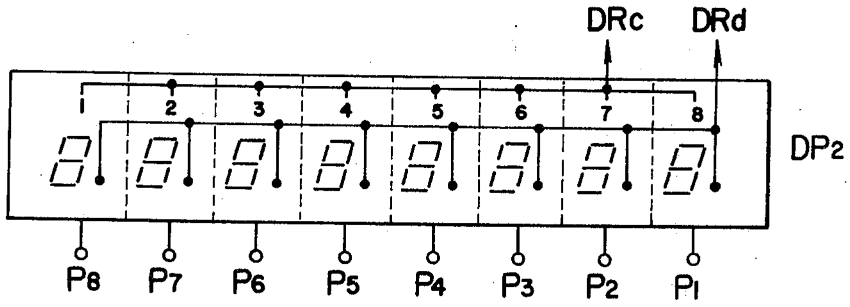
FIG. 1*b* is a diagram of an alternative display device which may be used with the invention.
Figure 2:
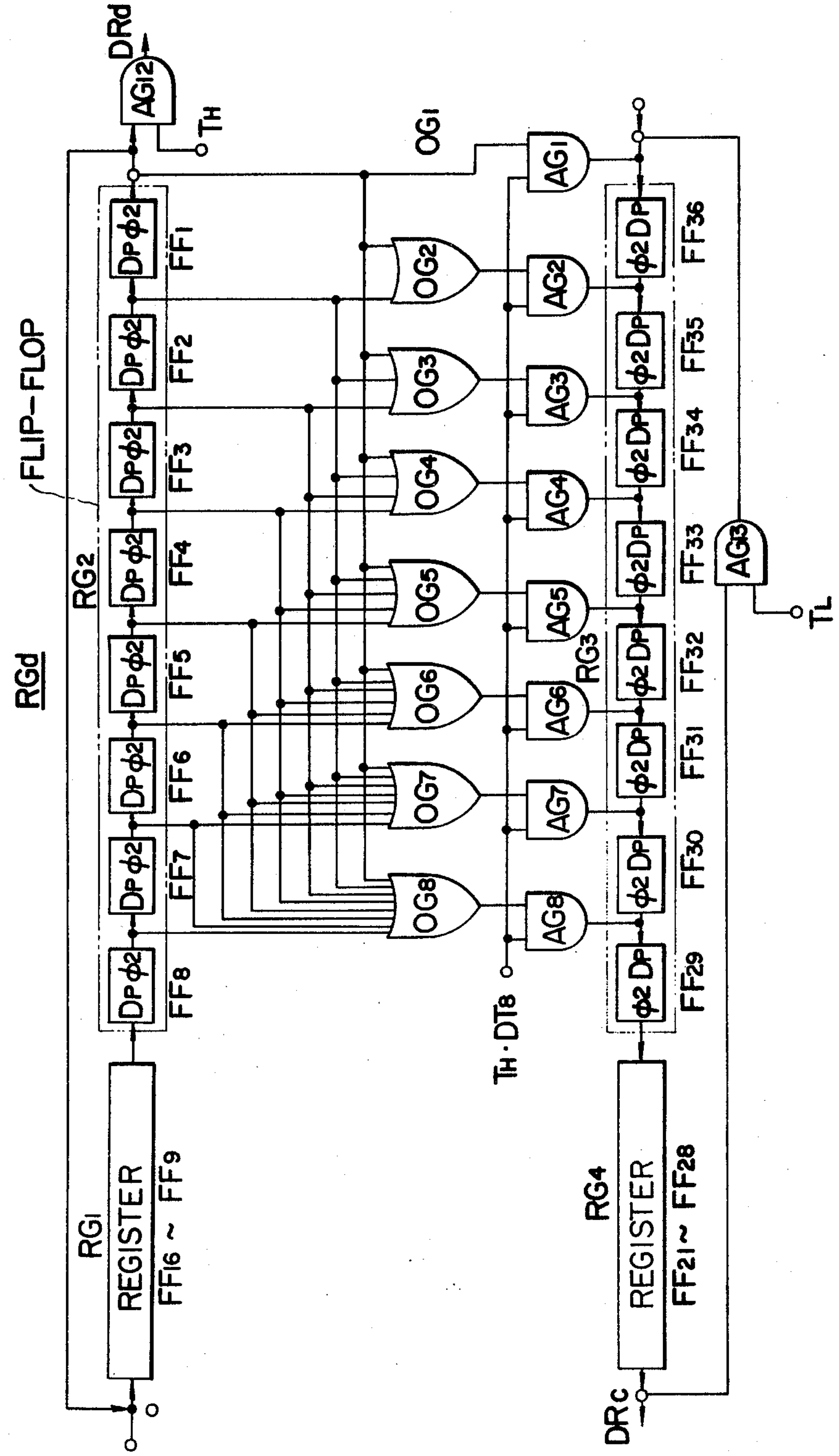
FIG. 2 is a schematic block diagram of a second embodiment of the present invention.
Figure 3:
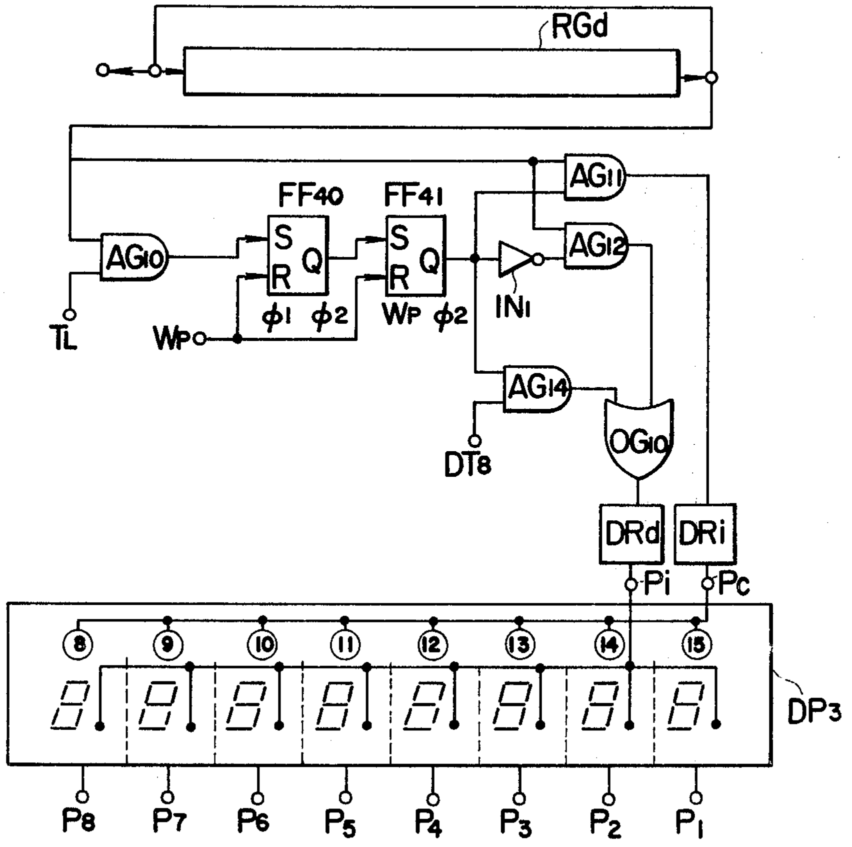
FIG. 3 is a schematic block diagram of a third embodiment of the present invention.
Figure 4:
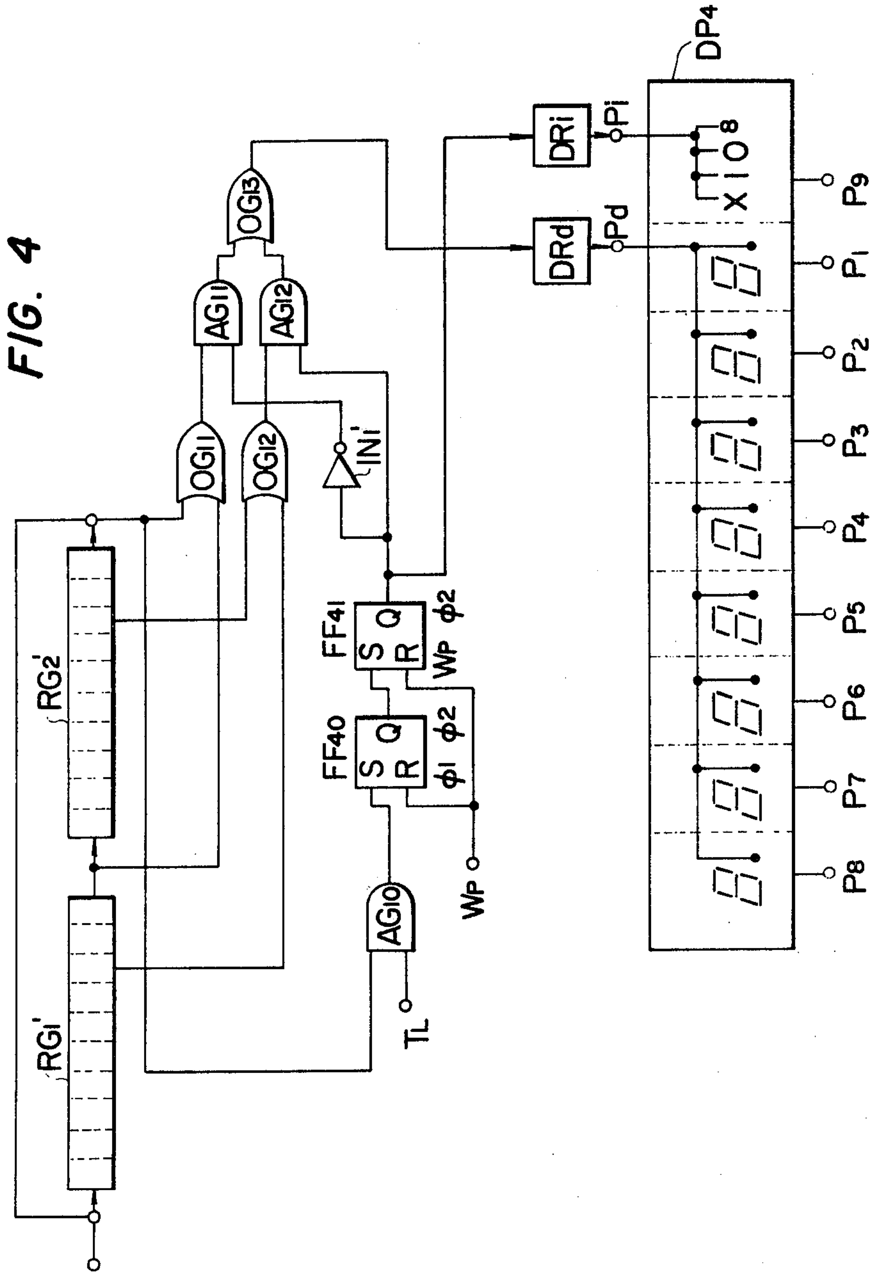
FIG. 4 is a schematic block diagram of a fourth embodiment of the present invention.

among the illustrated embodiments, the circuits in FIGS. 1a and 1b indicate an exponent in the form of the position of a comma and in the form of a digit, respectively; the circuit in FIG. 2 indicates an exponent in the form of the number of commas; the circuit in FIG. 3 indicates an exponent under the condition in which a decimal point is fixed to the uppermost place; and the circuit in FIG. 4 indicates round numbers under the condition in which an exponent is fixed to "8" (signifying$\times 10^8$) and a decimal point is made floating.

PREFERRED EMBODIMENTS OF THE INVENTION

FIG. 1*a* illustrates an embodiment of the exponent indicating system according to the present invention.

Referring to the figure, $RG_d$ designates a decimal point register which stores the position of the decimal point of a set number or a calculated result. The decimal point register $RG_d$ has a memory capacity in excess of the effective calculation or indication places. For example, assuming the number of effective calculation or indication places to be eight, the memory capacity of the decimal point register $RG_d$ may correspond to sixteen places. In order to facilitate the explanation, the anterior 8place stage portion of the register $RG_d$ is represented as a register $RG_1$, while the posterior 8-place stage portion is represented as a register $RG_2$. The register $RG_2$ of the posterior stage portion is one added anew for the indication of an exponent. This mechanism will be clearly understood from the explanation of the operation as given hereinbelow.

Figure 5:
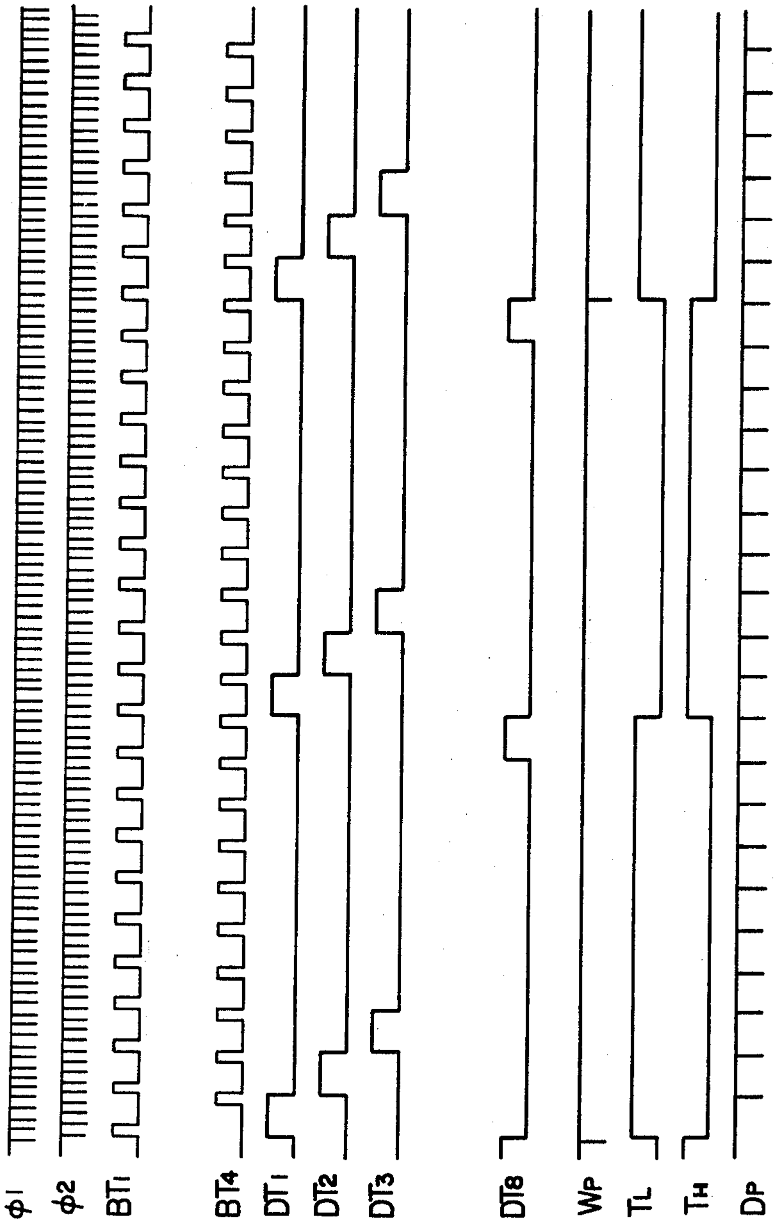
FIG. 5 is a waveform diagram illustrating various waveforms which appear in the circuits of the other figures.

A 2-input AND gate $AG_{10}$ receives at one of its inputs a decimal point signal stored in the register $RG_d$ and at the other input a timing pulse $T_L$, as shown in FIG. 5. The gate $AG_{10}$ judges whether the decimal point indication or the exponent indication is to be made.

A 2-input AND gate $AG_{11}$ receives at one of its inputs the decimal point signal and at the other input the output signal of the AND gate $AG_{10}$. A 2-input AND gate $AG_{12}$ receives at one of its inputs the decimal point signal and at the other input the output signal of the AND gate $AG_{10}$ applied through an inverter IN. The gates $AG_{11}$ and $AG_{12}$ are employed as control gates which effect the changeover between the decimal point indication and the exponent indication in conformity with the contents of the register $RG_d$.

A display device $DP_1$ is made of display tubes, light emitting diodes or the like. Each of eight positions of the display $DP_1$ is provided with numeral indicating segments $S_1$–$S_7$ generally forming the shape of the figure 8, a decimal point indicating segment $S_d$, and a comma indicating segment $S_c$ for indicating the exponent. The electrodes of these indicating segments have one side thereof commonly connected to a corresponding one of the position driver terminals $P_1$–$P_8$ in each position. On the other side, the electrodes are commonly connected to respective segment driver terminals for each of corresponding segments of the eight positions. Among the segment driver terminals, only a decimal point segment-driving terminal $P_d$ and a comma segment-driving terminal $P_c$ are illustrated in the drawing. The position driver terminals $P_1$–$P_8$ are respectively connected to receive switching signals (digit signals) $DT_1$–$DT_8$, as shown in FIG. 5.

A decimal point driver circuit $DR_d$ drives the decimal point segments $S_d$ in accordance with the decimal point signal which has been received from the AND gate $AG_{12}$. Accordingly, the output terminal of the driver circuit $DR_d$ is connected to the decimal point driver terminal $P_d$. A comma driver circuit $DR_c$ drives the comma segments $S_c$ in response to the decimal point signal received from the AND gate $AG_{11}$. Therefore, the output terminal of the driver circuit $DR_c$ is connected to the comma driver terminal $P_c$.

The operation of the indicating circuit thus constructed will now be described.

When a number is set or a calculated result is requested, a decimal point signal representative of the position of the decimal point of the number is fed to the foremost stage portion of the register $RG_d$, and is circulatively stored within the register $RG_d$. Contents to be stored in the register RG, differ as below, in dependence on whether the integral part of the number falls within eight places or lies beyond eight places. In order to facilitate the explanation, the contents of the decimal point register $RG_d$ will be expressed hereunder throughout the description of any embodiment by reading out successively from the uppermost place the states of the respective places within a reference time immediately before the timing pulse $T_L$ shifts from the lower level (logic "0") to the upper level (logic "1"), namely, within a time in which the relation of $\overline{T}_L \cdot DT_8$ $(=T_H \cdot DT_8)=1$ holds among the timing pulse $T_L$, the digit signal $DT_8$, a bit signal $BT_4$ and a clock pulse $\phi_2$, as shown in FIG. 5.

When the integral part is covered within eight places, a predetermined place of the register $RG_1$ of the anterior stage portion becomes "1", and all the places of the register $RG_2$ of the posterior stage portion become "0". By way of example, for a number 1234.5678, the contents of the decimal point register $RG_d$ become "00010000 00000000."

When the integral part exceeds eight places, all the places of the register $RG_1$ of the anterior stage portion become "0", and a predetermined place of the register $RG_2$ of the posterior stage portion becomes "1". By way of example, for a number 33333333123, the contents of the decimal point register $RG_d$ become "0000000000100000." In summary, the binary signal "1" representing the decimal point appears in the anterior stage register $RG_1$ for a number whose integral part lies within eight places, while the signal "1" moves rightwards and appears in the posterior stage register $RG_2$ for a number whose integral part lies beyond eight places. In the latter case, the number of upper eight places is stored in the effective indication places of a numeral register (not shown) for storing numeral parts.

The AND gate $AG_{10}$ detects by the use of the timing pulse $T_L$, which of the anterior and posterior stage registers the binary signal "1" representative of the decimal point is contained in. In more detail, if the binary signal "1" is in the register $RG_2$ of the posterior stage portion, it will be delivered from the register $RG_d$ to the AND gate $AG_{10}$ in a period in which the timing pulse $T_L$ is "1". On the other hand, if it is in the register $RG_1$ of the anterior stage portion, it will be delivered to the AND gate $AG_{10}$ only during a period in which the timing pulse $T_L$ is "0". For this reason, when the output of the AND gate $AG_{10}$ become "1", it is an indication that the binary signal representing the decimal point is included in the register $RG_2$ of the posterior stage portion, namely, that the integral part of the set number has more than eight places. In contrast, when the output of the AND gate $AG_{10}$ is "0", it is an indication that the integral part of the number lies within eight places.

Whether the decimal point signal stored in the register $RG_d$ is to be fed to the decimal point driver circuit $DR_d$ or to the comma driver circuit $DR_c$ is determined on the basis of the detecting result of the AND gate $AG_{10}$. This distribution or changeover is executed by the AND gates $AG_{11}$ and $AG_{12}$. More specifically, in the case where the integral part exceeds the number of effective indication places, that is, where the output of the AND gate $AG_{10}$ is "1", the AND gate $AG_{11}$ is enabled and the decimal point signal is fed to the comma driver circuit $DR_c$ for exponent indication. In case where it falls within the effective indication places, that is, where the output of the AND gate $AG_{10}$ is "0", the AND gate $AG_{12}$ is enabled and the decimal point signal is fed to the decimal point driver circuit $DR_d$.

For example, in the case where the integral part of a number has eleven places (33333333123) exceeding the eight effective indication places by three places, the contents of the decimal point register $RG_d$ become "00000000 00100000." The decimal point signal delivered from the register $RG_d$ (in this case, synchronized with the digit signal $DT_5$) is fed to the comma drivier circuit $DR_c$, to light the comma indicating segment $S_c$ which is in the third place as determined from the uppermost place (in the fifth place as determined from the lowermost place) and having the digit signal $DT_5$ applied to the electrodes on one side. The approximate figures of the number are indicated as "33333333" in the display $DP_1$. Also in the case where the integral part consists of three places, the decimal point signal synchronized with the digit pulse $DT_5$ is delivered from the decimal point register $RG_d$. However, it is fed to the decimal point driver circuit $DR_d$ by the AND gate $AG_{12}$. In this case, the decimal point segment $S_d$ in the fifth place is lit.

With the display device $DP_1$ in FIG. 1*a*, in the case where the integral part exceeds the effective indication places by $n$ places, the exponent indication is performed in such a way that the comma indicating segment in the $n$-th place, as determined from the uppermost one, is lit. In order to make the reading easier, the comma indicating segments $S_c$ may be replaced with separate numerical indicating elements which are located in the respective places, as illustrated in FIG. 1*b*. In this case, when the indication is, for example, "43678245," it is read as expressing $43678245 \times 10^3$.

FIG. 2 shows another embodiment of the exponent indicating circuit according to the present invention.

The exponent indicating circuit in FIG. 2 is constructed by adding OR gates $OG_2$–$OG_8$, AND gates $AG_1$–$AG_8$ and registers $RG_3$ and $RG_4$ to the exponent indicating circuit in FIG. 1*a*. It is a circuit for indicating an exponent in the form of a number of commas. That is, in accordance with the exponent indicating circuit in FIG. 2, the exponent $n$ of the round numbers $A \times 10^n$ is indicated by lighting $n$ commas.

Referring to the figure, the $i$-th OR gate $OG_i$ receives as its inputs the output signals of all of the flip-flop circuits from the lowermost place $FF_1$ to the $i$-th place $FF_i$ among the flip-flop circuits $FF_1$–$FF_8$, which constitute the decimal point register of the posterior stage $RG_2$. For example, the fifth OR gate $OG_5$ receives the output signals of the flip-flop circuits $FF_1$–$FF_5$ as its inputs.

The AND gates $AG_1$–$AG_8$ are employed as control gates which control the timing for supplying the output signals of the OR gates $OG_1$–$OG_8$. To control the input terminals of the AND gates, there is applied a timing pulse $T_H \cdot DT_8$ which is the logical product between the timing pulse $T_H$ and the digit signal $DT_8$. When a decimal point signal of sixteen places is just loaded in the decimal point register $RG_d$, the AND gates $AG_1$–$AG_8$ are enabled.

The registers $RG_3$ and $RG_4$ store signals fed from the AND gates $AG_1$–$AG_8$. The output signal of a flip-flop circuit $FF_{21}$ in the lowermost place of the register $RG_4$ is fed to the comma segment driver circuit $DR_c$, shown in FIG. 1*a*. The output signal of the flip-flop circuit $FF_1$ in the lowermost place of the register $RG_2$ is fed to the decimal point segment driver circuit $DR_d$ through the AND gate $AG_{12}$ which is controlled by the timing pulse $T_H$.

The posterior stage of the register $RG_4$ is fed back to the anterior stage of the register $RG_3$ through an AND gate $AG_{13}$. The opening and closing of the feedback loop is controlled by the timing pulse $T_L$. When the feedback loop is opened, that is, when the timing pulse $T_L$ becomes "0" to disable the AND gate $AG_{13}$, the contents of the register $RG_3$ are cleared. The registers $RG_3$ and $RG_4$ can also be used as registers for arithmetic control, for example, registers for controlling the progress of multiplication and division. In this case, the AND gates $AG_1$–$AG_8$ may be disabled during the calculations. In the embodiment, the two registers $RG_3$ and $RG_4$ are connected in cascade, and thus the duty $d$ of the indication is enhanced ($d$=⅛). In the case where a reduction of the number of circuit elements is more preferable even at some sacrifice of the duty $d$ ($d$=1/16), only the register $RG_3$ may be employed in a manner to circulate its contents by means of the AND gate $AG_{13}$.

Description will now be made of the operation of the exponent indicating circuit thus constructed.

The AND gate $AG_{12}$ effects essentially the same operation as that of the AND gate $AG_{12}$ in FIG. 1. If the binary signal "1" is contained in the decimal point register of the anterior stage portion $RG_1$ (when the integral part is covered within eight places), it will be supplied from the register $RG_2$ to the AND gate $AG_{12}$ at the level "1" of the timing pulse $T_H$. Since the AND gate $AG_{12}$ is in the enabled state at this time, the binary signal "1" subsequently passes through the AND gate $AG_{12}$ and is supplied to the decimal point driver circuit $DR_d$. On the other hand, if the binary signal "1" is contained in the decimal point register of the posterior stage portion $RG_2$ (in the case where the integral part of the number has more than eight places), it will be supplied from the register $RG_2$ to the AND gate $AG_{12}$ at the level "1" of the timing pulse $T_L$, namely, at the level "0" of the timing pulse $T_H$. Since, however, the AND gate $AG_{12}$ is in the disabled state at this time, the binary signal "1" cannot pass through the AND gate $AG_{12}$ and is not fed to the decimal point driver circuit $DR_d$.

In summary, the AND gate $AG_{12}$ functions to pass the decimal point signal for the integral part within eight places, and to block the decimal point signal for the integral part over eight places. In the former case, a predetermined decimal point segment $S_d$ is lit. In the latter case, no decimal point segment $S_d$ is lit.

The $i$-th OR gate $OG_i$ detects when any one of the outputs of the flip-flop circuits of the first to $i$-th places $FF_1$ to $FF_i$ becomes "1". In other words, when the output of the flip-flop circuit of the i-th place $FF_i$ becomes "1", the the outputs of OR gates $OG_i$ to $OG_8$ become "1". The output signals of flip-flop $FF_1$ and the OR gates $OG_2$–$OG_8$ are controlled by the AND gates $AG_1$–$AG_8$, and are fed to the flip-flop circuits $FF_{29}$–$FF_{36}$ in parallel. The timing at which the AND gates $AG_1$–$AG_8$ are enabled corresponds to the time at which the timing pulse $T_H \cdot DT_8$ becomes "1". Accordingly, only when the integral part of the number exceeds eight figures is the signal "1" fed to some of the flip-flop circuits $FF_{29}$–$FF_{36}$. By way of example, for the integral part of a twelve-figure number (345678443213) which exceeds eight figures by four places, the contents of the decimal point register $RG_d$ become "00000000 00010000". Then, the signal "1" is fed to the four flip-flop circuits $FF_{29}$–$FF_{32}$. That is, the contents of the register $RG_3$ become "00001111" from the uppermost place (from $FF_{36}$). The signal is fed to the comma driver circuit $DR_c$. Thus, the 12-figure number is indicated as "34567844", which can be read as expressing approximate figures $34567844 \times 10^4$. In this way, the exponent 4 is indicated in such a manner that commas in the lower places are lit.

If the contents of the register $RG_3$ are circulated in the opposite direction, the twelve-figure number will be indicated as "3,4,5,67844". Unlike the case of the circuit in FIG. 2, the exponent 4 is indicated in such manner that commas in the upper places are lit.

FIG. 3 shows a further embodiment according to which the exponent indicating circuit in FIG. 1 is somewhat modified. Herein, an exponent is indicated by one of the exponent indicating elements ⑧-⑮ which are disposed above the respective numeral segments forming the shape of the figure 8. When the exponent indication is performed, the position of the decimal point is fixed to the uppermost place.

Differences in the exponent indicating circuit in FIG. 3 from that in FIG. 1 principally relate to the additional provision of set preference RS flip-flop circuits $FF_{40}$ and $FF_{41}$, and AND gate $AG_{14}$ and an OR gate $OG_{10}$, and that the display elements ⑧-⑮ are employed instead of the comma indicating segments $S_c$ as the exponent indicating elements.

The set preference RS flip-flop circuit $FF_{40}$ in FIG. 3 is a delay type flip-flop circuit whose writing operation is conducted by a clock pulse $\phi_1$ shown in FIG. 5 and whose reading operation is conducted by the clock pulse $\phi_2$. The set input terminal S of the flip-flop circuit $FF_{40}$ is connected to receive the output signal of the AND gate $AG_{10}$ namely, the signal indicating if the integral part exceeds eight places of the effective indication places. The delay type set preference RS flip-flop circuit $FF_{41}$ whose writing operation is conducted by a timing pulse (word pulse) $W_p$ shown in FIG. 5, has its set input terminal S connected to an output terminal Q of the flip-flop circuit $FF_{40}$. The flip-flop circuits $FF_{40}$ and $FF_{41}$ are adapted to be reset by the word pulse $W_p$. Although detailed explanation of the operation is omitted, these flip-flop circuits store the output signal of the AND gate $AG_{10}$ for fixed periods of time (the period of the pulses $\phi_1$ as to $FF_{10}$, the period of the pulses $W_p$ as to $FF_{41}$) on the basis of the standard truth tables of the set preference flip-flop circuits. That is, the flip-flop circuits $FF_{40}$ and $FF_{41}$ store an indication if the integral part exceeds the effective indication places. In case where the effective indication places are exceeded, an output "1" is provided, whereas in the case where they are not exceeded, an output "0" is provided.

One of input terminals of the AND gate $AG_{14}$ is connected to receive the digit signal $DT_8$ for lighting the decimal point in the eighth place under the fixed state, while the other control input terminal is connected to receive the output signal of the flip-flop circuit $FF_{41}$. To the inputs of the OR gate $OG_{10}$, there are applied the digit signal $DT_8$ (fixed point lighting signal) received after the control by the AND gate $AG_{14}$ and a floating point lighting signal received after the control by the AND gate $AG_{12}$. An output signal of the OR gate $OG_{10}$ is fed to the decimal point driver circuit $DR_d$.

A display device $DP_3$ is provided with the exponent indicating segments ⑧-⑮ as previously stated. These exponent indicating segments are successively driven from the lowermost place by the digit signals $DT_1$–$DT_8$.

The exponent indicating circuit operates as described below.

In the case where the integral part of the number falls within eight places forming the effective indication places, the output of the flip-flop circuit $FF_{41}$ is always "0", and hence the AND gate $AG_{14}$ is held disabled. As a consequence, similarly to the circuit in FIG. 1, the circuit in FIG. 3 effects only a decimal point indication and does not effect an exponent indication.

In the case where the number of figures of the integral part exceeds the number of effective indication places, the output of the flip-flop circuit $FF_{41}$ is always "1". The AND gate $AG_{12}$ is therefore kept disabled, so that the floating point signal is not fed from the decimal point register $RG_d$ to the decimal point driver circuit $DR_d$. On the other hand, the AND gate $AG_{14}$ is enabled, so that the fixed point signal $DT_8$ passes through the AND gate $AG_{14}$ and the OR gate $OG_{10}$, to be fed to the decimal point driver circuit $DR_d$. Thus, the decimal point segment in the uppermost place (the eighth place) is fixedly lit. Further, the AND gate $AG_{11}$ is also enabled, so that the decimal point signal passes through the AND gate $AG_{11}$, to be fed to an exponent driver circuit $DR_i$. Thus, a predetermined exponent indicating element is lit. In this manner, in the case where the integral part exceeds the effective indication places by $m$ places, the $m$-th exponent indicating element as determined from the uppermost place is lit as in FIG. 1. By

⑩ way of example, a number 45678324283 is indicated as "4.5678324", and the indication is read as expressing the round number $4.5678324 \times 10^{10}$.

FIG. 4 illustrates a still further embodiment of the exponent indicating circuit according to the present invention. With this embodiment, in the case where the integral part exceeds the number of effective indication places, the indication is made with the fixed exponent 8. In correspondence with the number of excessive places, the decimal point moves.

The construction of the exponent indicating circuit in FIG. 4 differs from that of the embodiment in FIG. 3, in the following points:

1. An indicating element '$\times 10^8$ is provided. A pin $P_9$ connected to electrodes of the indicating element on one side is connected to receive a DC voltage or a timing pulse such as a digit signal.

2. In order to raise the indication duty of the decimal point segments, the decimal point signal is derived from both a decimal point register of the anterior stage $RG_1'$ and a decimal point register of the posterior stage $RG_2'$, and is fed to the decimal point driver circuit $DR_d$.

3. The number of places of each of the decimal point registers $RG_1'$ and $RG_2'$ is increased by 2 for detection of an overflow, counting fraction over ½ as one and disregarding the rest, and so forth. Consequently, in the case where the number of places of the integral part is greater than eight, which forms the number of effective indication places (in the case where the exponent indication is performed), the decimal point signal is supplied from the third place of each register to the decimal point driver circuit $DR_d$. For the same reason, the number of the digit signals differing in phase from one another is increased from 8 to 10 though no illustration is made.

The operation of this exponent indicating circuit will now be explained.

When the integral part is covered within eight places forming the effective indication places, the output of the flip-flop circuit $FF_{41}$ is always "0", and hence, the exponent driver circuit $DR_i$ does not operate and the indicating element '$\times 10^8$' is not lit. The AND gate $AG_{11}$ is enabled, while the AND gate $AG_{12}$ is disabled. Therefore, the decimal point signal is delivered only from the lowermost places of the anterior and posterior stage registers through the OR gate $OG_{11}$, AND gate $AG_{11}$ and OR gate $OG_{13}$ to the decimal point driver circuit $DR_d$. Thus, a predetermined decimal point segment is lit.

In the case where the integral part has more places than the effective indication places, the output of the flip-flop circuit $FF_{41}$ is always "1". Hence, the exponent driver circuit $DR_i$ operates to light the indicating element '$\times 10^8$.' At this time the AND gate $AG_{11}$ is disabled, while the AND gate $AG_{12}$ is enabled. Therefore, the decimal point signal is delivered from the third places (as reckoned from the lowermost place) of the anterior and posterior stage registers through the OR gate $OG_{12}$, AND gate $AG_{12}$ and OR gate $OG_{13}$ to the decimal point driver circuit $DR_d$. Thus, a predetermined decimal point segment is lit in correspondence with the number of places in excess of the number of effective indication places. It will be understood that the indication duty $d$ of the decimal point segments is 1/10 in this case (without the OR gates $OG_{11}$ and $OG_{12}$, $d$=1/20).

As stated above, the position at which the decimal point signal is derived from each register is changed-over between the lowermost place and the third place as reckoned from the lower-most place in dependence on whether or not the integral part exceeds the effective indication places. The reason for the changeover will be more definitely understood from the following description.

The changeover is ascribable to the fact that, since the two additional places are provided for the detection of an overflow, etc., in each of the anterior and posterior stage-decimal point registers, the position of the decimal point shifts leftwards in the case where the number of places of the integral part is over the number of effective indication places. More specifically, if the decimal point signal is always derived from the lowermost place of each register, the contents of the decimal point register $RG_d$ will become "0000000001 0000000000" for the integral part of eight places. The decimal point segment in the first place is thus lit, so that no trouble arises. However, for the integral part exceeding eight places, by way of example, for a number 333333333333 greater than the eight places by four places, the contents of the decimal point register $RG_d$ becomes "00000000000001000000". Since the signal "1" is present in the seventh place as reckoned from the lowermost place, the decimal point signal synchronized with the digit signal $DT_7$ appears in the lowermost place of the register $RG_2'$ or $RG_1'$. Eventually, the decimal point segment in the second place as reckoned from the uppermost one is lit, to indicate the number as $33.333333 \times 10^8$ which is smaller by two places than actually should be. Therefore, the decimal point signal in the case of performing the exponent indication is derived two places previously in the embodiment. Accordingly, in the case where the decimal point register $RG_d$ is employed as the memory register for only the decimal point and the exponent as in the embodiments of FIGS. 1–3, the OR gate $OG_{12}$, inverter $IN_1$, AND gates $AG_{11}$ and $AG_{12}$ and OR gate $OG_{13}$ can be dispensed within the exponent indicating circuit in FIG. 4.

As described above, in accordance with the present invention, the capacity (the number of memory places) of the decimal point register is made larger than the number of effective calculation places or the number of effective indication places, and the exponent indication is effected by utilizing the increased places. It is therefore possible that a number whose number of places is greater than the number of effective indication places or the number of effective calculation places can be indicated in approximate figures.

Although the present invention has been described in connection with the preferred embodiments, it can adopt various modified means without being restricted thereto.

For example, an exponent indicating circuit may be constructed by combining the embodiments in FIGS. 1 to 4. For example, the indication duty can be raised in such way that the OR gate $OG_{11}$ etc., in the circuit of FIG. 4 are added to the circuits of FIGS. 1 and 3.

Although, in the embodiments, the decimal point signal not coded is stored in the decimal point register $RG_d$, the same object can be similarly accomplished when a decimal point signal coded into binary signals of 1, 2, 4, 8 ..... is stored in the register. In this case, accessory circuits, such as a decoder circuit, are required, but the capacity of the whole decimal point register can be reduced. Needless to say, the present invention is also applicable to the display device of a printer, etc.

What is claimed is:

1. An exponent indicating system for use with a numerical display device having a plurality of display positions, a decimal point indicator element for each position and an exponent indicator element, said system comprising a decimal point shift register having a number of stages which exceeds the number of display positions of said display device for storing the position of a decimal point of a number, an exponent indicator driver circuit connected to said exponent indicator element, first means connected to the output of said register for detecting the relative position of said decimal point with respect to the number of display positions in said display device, and second means connected to said register and said first gating means for actuating said exponent indicator driver circuit in dependence on the position of said decimal point in said number.

2. An exponent indicating system as defined in claim 1, wherein said first means includes a first AND gate having one input connected to the output of said register and clock means for applying a periodic clock pulse to a second input of said AND gate, said clock pulse having a duration equal to the shifting time of a number of stages of said register equal to the number of display positions of said display device.

3. An exponent indicating system as defined in claim 2, wherein said second means includes a second AND gate having one input connected to the output of said register and a second input connected to the output of said first AND gate, the output of said second AND gate being connected to said exponent indicator driver circuit.

4. An exponent indicating system as defined in claim 3, further including a decimal point driver circuit connected to said decimal point indicator elements, and wherein said second means further includes a third AND gate having one input connected to the output of said register and an inverter circuit connecting the output of said first AND gate to a second input of said third AND gate, the output of said third AND gate being connected to said decimal point driver circuit.

5. An exponent indicating system as defined in claim 3, wherein said shift register has a number of stages equal to twice the number of display positions of said display device.

6. An exponent indicating system as defined in claim 3, wherein said first means further includes first and second flip-flops connected in tandem between the output of said first AND gate and the input to said second AND gate.

7. An exponent indicating system as defined in claim 6, further including a decimal point driver circuit connected to said decimal point indicator elements, and wherein said second means further includes a third AND gate having one input connected to the output of said register and an inverter circuit connecting the output of said second flip-flop to a second input of said third AND gate, the output of said third AND gate being connected to said decimal point driver circuit.

8. An exponent indicating system as defined in claim 7, wherein said second means further includes a fourth AND gate having one input connected to the output of said second flip-flop and a second input receiving a timing pulse, and an OR gate having inputs connected to the outputs of said third and fourth AND gates and an output connected to said decimal point driver circuit.

9. An exponent indicating system for use with a numerical display device having a plurality of display positions, a decimal point indicator element for each position and an exponent indicator element, said system comprising a decimal point shift register having a number of stages which exceeds the number of display positions of said display device for storing the position of a decimal point of a number, an exponent indicator driver circuit connected to said exponent indicator element, first means connected to the output of said register for detecting the relative position of said decimal point with respect to the number of display positions in said display device, second means connected to said register for actuating said exponent indicator driver circuit in dependence on the position of said decimal point in said number, and a decimal point driver circuit responsive to said first means for actuating said decimal point indicator elements.

10. An exponent indicating system as defined in claim 9, wherein said shift register comprises first and second shift register portions connected in tandem and each portion having a number of stages equal to the number of display positions of said display device.

11. An exponent indicating system as defined in claim 10, wherein said second means includes a second shift register corresponding to the decimal point shift register, a plurality of OR gates corresponding to the respective stages of said second shift register portion and each having inputs connected to the respective outputs of each stage of said second shift register portion of equal or lower order, and a plurality of AND gates connecting the outputs of the respective OR gates to the inputs to respective stages of said second shift register, the output of said second shift register being connected to said exponent indicator driver circuit.

12. An exponent indicating system as defined in claim 9, wherein said second means includes a first AND gate having one input connected to the output of said register and clock means for applying a periodic clock pulse to a second input of said AND gate, said clock pulse having a duration equal to the shifting time of a number of stages of said register equal to the number of display positions of said display device.

13. An exponent indicating system as defined in claim 12, wherein said second means includes first and second flip-flops connected in tandem between output of said first AND gate and said exponent indicator driver circuit.

14. An exponent indicating system as defined in claim 13, wherein said shift register is made up of first and second shift register portions connected in tandem and each having a number of stages exceeding the number of display positions of said display device.

15. An exponent indicating system as defined in claim 14, wherein said first means includes a first OR gate having inputs connected to the respective outputs of said shift register positions and means connecting the output of said first OR gate to said decimal point driver circuit.

16. An exponent indicating system as defined in claim 14, wherein said first means further includes a first OR gate having inputs connected to the respective outputs of said shift register portions, a second OR gate having respective inputs connected to intermediate points of said first and second shift register portions, second and third AND gates having first inputs connected respectively to the outputs of said first and second OR gates, inverter means for applying to a second input of said first OR gate the inverted output of said second flip-flop, a second input of said second OR gate being connected directly to the output of said second flip-flop, and a third OR gate receiving the outputs of said second and third AND gates and having its output connected to said decimal point driver circuit.

* * * * *